(12) United States Patent
Lim et al.

(10) Patent No.: US 10,694,187 B2
(45) Date of Patent: Jun. 23, 2020

(54) METHOD AND DEVICE FOR DERIVING BLOCK STRUCTURE IN VIDEO CODING SYSTEM

(71) Applicant: LG Electronics Inc., Seoul (KR)

(72) Inventors: Jaehyun Lim, Seoul (KR); Naeri Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/086,162

(22) PCT Filed: Mar. 18, 2016

(86) PCT No.: PCT/KR2016/002742
§ 371 (c)(1),
(2) Date: Sep. 18, 2018

(87) PCT Pub. No.: WO2017/159901
PCT Pub. Date: Sep. 21, 2017

(65) Prior Publication Data
US 2019/0104312 A1    Apr. 4, 2019

(51) Int. Cl.
*H04N 19/119* (2014.01)
*H04N 19/139* (2014.01)
*H04N 19/176* (2014.01)
*H04N 19/184* (2014.01)
(Continued)

(52) U.S. Cl.
CPC ......... *H04N 19/139* (2014.11); *H04N 19/103* (2014.11); *H04N 19/119* (2014.11);
(Continued)

(58) Field of Classification Search
CPC .. H04N 19/119; H04N 19/139; H04N 19/176; H04N 19/184
(Continued)

(56) References Cited

U.S. PATENT DOCUMENTS

2009/0290643 A1* 11/2009 Yang ............... H04N 19/597
                                                    375/240.16
2010/0020867 A1* 1/2010 Wiegand ............ H04N 19/34
                                                    375/240.02
(Continued)

FOREIGN PATENT DOCUMENTS

KR    1020080107965    12/2008
KR    1020110135761    12/2011
(Continued)

OTHER PUBLICATIONS

International Search Report in International Application No. PCT/KR2016/002742, dated Dec. 1, 2016, 4 pages.

*Primary Examiner* — Jeremiah C Hallenbeck-Huber

(74) *Attorney, Agent, or Firm* — Fish & Richardson P.C.

(57) ABSTRACT

A video decoding method performed by a decoding device, according to the present invention, comprises the steps of: deriving at least one reference block for an object block; deriving a partitioned structure of the object block on the basis of a partitioned structure of the at least one reference block; partitioning the object block into a plurality of sub blocks on the basis of the derived partitioned structure; and generating recovered samples by decoding the plurality of sub blocks. According to the present invention, a partitioned structure of a current picture can be derived on the basis of a reference block of a neighboring picture, and thus the amount of data used in the additional information signaled for partitioning of the current picture can be reduced and overall coding efficiency can be improved.

19 Claims, 15 Drawing Sheets

(a)    (b)    (c)

(51) Int. Cl.
*H04N 19/103* (2014.01)
*H04N 19/503* (2014.01)
*H04N 19/463* (2014.01)

(52) U.S. Cl.
CPC ......... *H04N 19/176* (2014.11); *H04N 19/184* (2014.11); *H04N 19/463* (2014.11); *H04N 19/503* (2014.11)

(58) Field of Classification Search
USPC .................................................. 375/240.16
See application file for complete search history.

(56) References Cited

U.S. PATENT DOCUMENTS

| | | | | |
|---|---|---|---|---|
| 2011/0310976 A1* | 12/2011 | Wang | ................... | H04N 19/176 375/240.24 |
| 2013/0287104 A1* | 10/2013 | Jeong | ................... | H04N 19/197 375/240.12 |
| 2013/0287109 A1* | 10/2013 | Wang | ................... | H04N 19/176 375/240.16 |
| 2014/0098189 A1* | 4/2014 | Deng | ................... | H04N 19/176 348/43 |
| 2015/0208067 A1* | 7/2015 | Jung | ................... | H04N 19/119 375/240.02 |
| 2016/0261868 A1* | 9/2016 | Chien | ................... | H04N 19/70 |

FOREIGN PATENT DOCUMENTS

| | | |
|---|---|---|
| KR | 1020120017407 | 2/2012 |
| KR | 1020140083033 | 7/2014 |
| KR | 1020150000073 | 1/2015 |

\* cited by examiner

FIG. 3
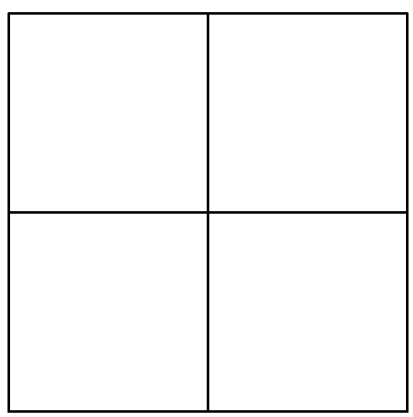
(a)
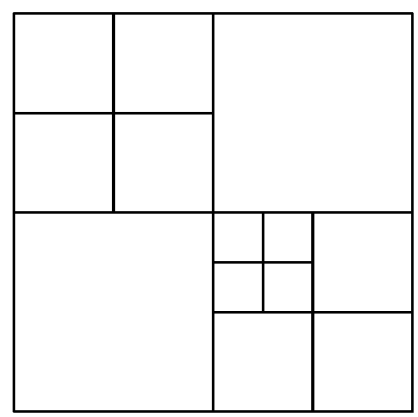
(b)

FIG. 13

METHOD AND DEVICE FOR DERIVING BLOCK STRUCTURE IN VIDEO CODING SYSTEM

CROSS-REFERENCE TO RELATED APPLICATIONS

This application is a National Stage application under 35 U.S.C. § 371 of International Application No. PCT/KR2016/002742, filed on Mar. 18, 2016, the disclosure of which is herein incorporated by reference in its entirety.

BACKGROUND OF THE INVENTION

Field of the Invention

The present invention relates to a video coding technique, and more particularly, to a coding method and apparatus based on efficient block structure derivation in a video coding system.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

It is an object of the present invention to provide a method and apparatus for improving video coding efficiency.

It is another object of the present invention to provide a method and apparatus for efficiently deriving a block structure in a picture.

It is further another object of the present invention to provide a method and apparatus for deriving a block structure of a current picture based on neighboring pictures.

It is further another object of the present invention to provide a method and apparatus for dividing a current picture using division information of neighboring pictures.

It is further another object of the present invention to provide a method and apparatus for dividing a current picture with small amount of data.

According to an embodiment of the present invention, there is provided a video decoding method performed by a decoding apparatus, the method including deriving at least one reference block for a target block, deriving a division structure of the target block based on a division structure of the at least one reference block, dividing the target block into a plurality of blocks based on the derived division structure, and decoding the plurality of blocks to thereby generate reconstructed samples.

According to another embodiment of the present invention, there is provided a video encoding method performed by an encoding apparatus, the method including deriving at least one reference block for a target block, deriving a division structure of the target block based on a division structure of the at least one reference block, dividing the target block into a plurality of blocks based on the derived divided structure, and encoding the plurality of detail blocks to thereby output an encoding parameter.

According to the present invention, the division structure of the current picture may be derived based on the reference block of the neighboring picture, through which the amount of data used for the additional information signaled for the division of the current picture may be reduced, and the overall coding efficiency may be improved.

BRIEF DESCRIPTION OF THE DRAWINGS

FIG. 3 illustrates an example of a fixed block division structure and a variable block division structure.

FIG. 13 illustrates an example of a comparison between the data amount of the existing division information and the data amount of the division information according to the present invention.

DESCRIPTION OF EXEMPLARY EMBODIMENTS

Figure 1:
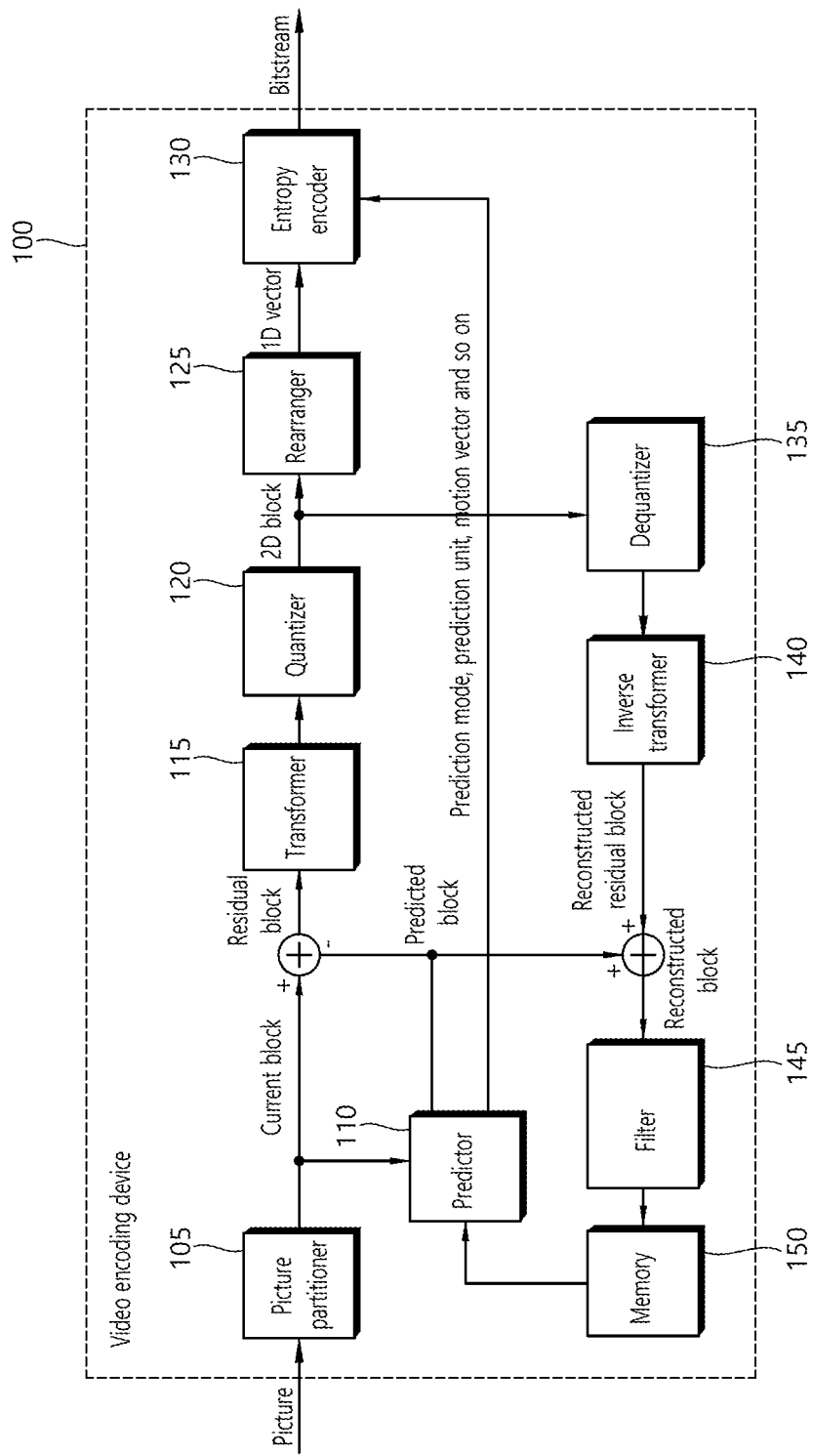
FIG. 1 is a block diagram schematically illustrating a video encoding device according to an embodiment of the present invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioner 105, a predictor 110, a transformer 115, a quantizer 120, a rearranger 125, an entropy encoder 130, a dequantizer 135, an inverse transformer 140, a filter 145, and memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Also, the TU may be split into a quad tree structure from the CU. CTU may correspond to CTB (coding tree block), CU may correspond to CB (coding block), PU may correspond to PB (prediction block), and TU may correspond to TB (transform block).

The predictor 110 includes an inter prediction unit that performs an inter prediction process and an intra prediction unit that performs an intra prediction process, as will be described later. The predictor 110 performs a prediction process on the processing units of a picture divided by the picture dividing module 105 to create a prediction block including a prediction samples or a prediction samples array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed based on information on at least one of a previous picture and/or a subsequent picture of a current picture to create a prediction block. In the intra prediction, a prediction process may be performed based on pixel information of a current picture to create a prediction block.

As an inter prediction method, a skip mode, a merge mode, and Advanced Motion Vector Prediction (AMVP) may be used. In inter prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized. Pixels, pels and samples are used interchangeably each other herein.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MVD, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample according to the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoding device.

The transformer 115 performs a transform process on the residual block in the unit of TUs and generates transform coefficients.

A transform block is a rectangular block of samples and is a block to which the same transform is applied. The transform block may be a TU and may have a quad-tree structure.

The transformer 115 may perform a transform process according to the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the rearranger 125.

The rearranger 125 may rearrange the transform coefficients supplied from the quantizer 120. By rearranging the quantization coefficients, it is possible to enhance the encoding efficiency in the entropy encoder 130.

The rearranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the rearranger 125 or the encoding parameter value calculated during the encoding process, etc. and then to output a bitstream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoding device and passed to a decoding device like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Also, the residual signal may mean a difference between an original signal and a prediction signal. Also, the difference between the original signal and the prediction signal may be transformed to define the residual signal, or the difference between the original signal and the prediction signal may be transformed and quantized to define the residual signal. The residual signal can be called the residual block in the block unit, and can be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Accordingly, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Also, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, when necessary.

The dequantizer 135 dequantizes the values transform coefficients quantized by the quantizer 120. The inverse transformer 140 inversely transforms the values dequantized by the dequantizer 135.

The residual value or residual samples or residual samples array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process based on the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

The memory 150 may store the reconstructed block or picture calculated by the filter 145. The reconstructed block or picture stored in the memory 150 may be supplied to the predictor 110 that performs the inter prediction.

Figure 2:
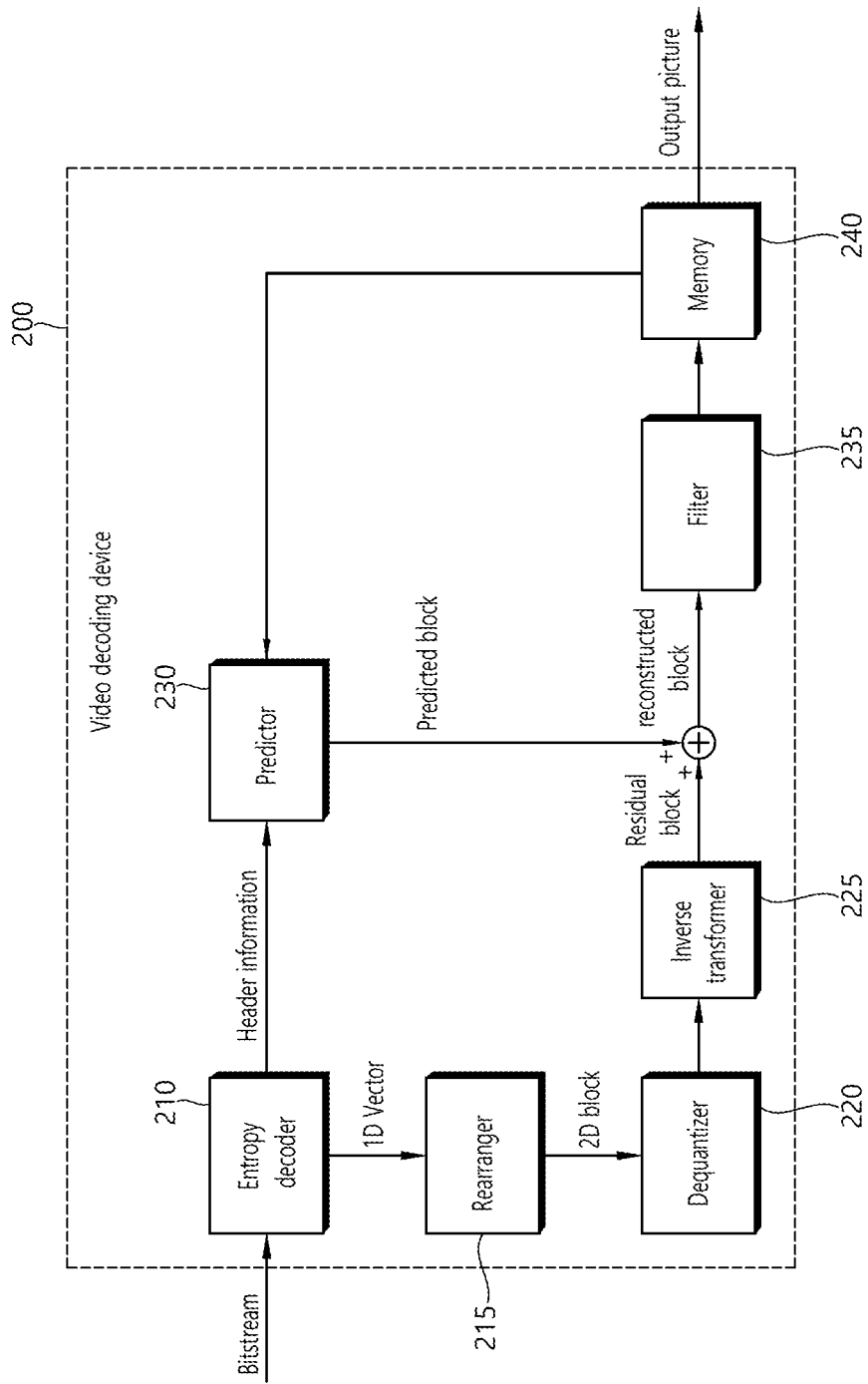
FIG. 2 is a block diagram schematically illustrating a video decoding device according to an embodiment of the present invention.

FIG. 2 is a block diagram schematically illustrating a video decoding device according to an embodiment of the invention. Referring to FIG. 2, a video decoding device 200 may include an entropy decoder 210, a rearranger 215, a dequantizer 220, an inverse transformer 225, a predictor 230, a filter 235, and memory 240.

When a video bitstream is input from the video encoding device, the input bitstream may be decoded based on the order in which video information is processed by the video encoding device.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoder 210 may perform decoding using the same VLC table as the encoding device used in the encoding device. Also, when CABAC is used to perform entropy encoding in a video encoding device, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the rearranger 215.

The rearranger 215 may rearrange the bitstream information, that is, the quantized transform coefficients, entropy-decoded by the entropy decoder 210 based on the rearrangement method in the video encoding device.

The rearranger 215 may reconstruct and rearrange the coefficients expressed in the form of a one-dimensional vector into coefficients in the form of a two-dimensional block. The rearranger 215 may scan the coefficients based on the prediction mode applied to the current block transform block and the size of the transform block and may create an array of coefficients quantized transform coefficients in the form of a two-dimensional block.

The dequantizer 220 may perform dequantization based on the quantization parameters supplied from the video encoding device and the coefficient values of the rearranged block.

The inverse transformer 225 may perform the inverse DCT and/or inverse DST of the DCT and/or DST, which has been performed by the transformer of the video encoding device, on the quantization result from the video encoding device.

The inverse transform may be performed based on a transfer unit or a partition unit of a picture determined by the video encoding device. The transformer of the video encoding device may selectively perform the DCT and/or DST according to plural information pieces such as the prediction method, the size of a current block, and the prediction direction, and the inverse transformer 225 of the video decoding device may perform the inverse transform based on the transform information on the transform performed by the transformer of the video encoding device.

The predictor 230 generates a prediction block including prediction samples or prediction samples array based on the prediction block generation-related information provided by the entropy decoder 210 and the previously decoded block and/or picture information provided from the memory 240.

When the prediction mode for the current PU is the intra prediction mode, the predictor 230 may perform the intra prediction to generate a prediction block based on pixel information in the current picture.

When the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoding device, such as motion vector and reference picture index may be deduced via checking the skip flag and merge flag received from the encoding device.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Also, the encoding device may transmit a reference picture index indicating a reference picture to the decoding device.

The predictor 230 of the decoding device may predict the motion vector of the current block using the motion information of the neighboring block and derive the motion vector of the current block using the residual received from the encoding device. The decoding device may generate prediction sample (or prediction sample array) for the current block based on the derived motion vector and the reference picture index information received from the encoding device.

The decoding device may generate a reconstructed sample (or reconstructed sample array) by adding a predictive sample (or a predictive sample array) and a residual sample (a residual sample array) obtained from the transform coefficients transmitted from the encoding device. And a reconstructed block and a reconstructed picture can be generated based on thereon.

In the above-described AMVP and merge modes, motion information of the reconstructed neighboring block and/or motion information of the Col block may be used to derive motion information of the current block.

In the skip mode, which is one of the other modes used for inter prediction, neighboring block information may be used for the current block as it is. Accordingly, in the case of skip mode, the encoder does not transmit syntax information such as the residual to the decoding device in addition to information indicating which block's motion information to use as the motion information for the current block.

The reconstructed block may be generated using the predicted block generated by the predictor 230 and the residual block provided by the inverse-transformer 225. FIG. 2 illustrates that using the adder, the predicted block and the residual block are combined to generate the reconstructed block. In this connection, the adder may be viewed as a separate element (a reconstructed block generator) that is configured to generate the reconstructed block. In this connection, the reconstructed block includes reconstructed samples or a reconstructed samples array as described above; the predicted block includes a prediction samples or a prediction samples array; the residual block may include a residual samples or a residual samples array. Accordingly, the reconstructed samples or the reconstructed samples array can be considered to be generated by combining the corresponding prediction samples or prediction samples array with the corresponding residual samples or residual samples array.

When the skip mode is used for a block, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoder 210, the rearranger 215, the dequantizer 220, the inverse transformer 225, the predictor 230, the filter 235 and the memory 240 which are included in the decoding device 200, for example, the entropy decoder 210, the rearranger 215, the dequantizer 220, the inverse transformer 225, the predictor 230, the filter 235, and so on may be expressed as a decoder or a decoding module that is distinguished from other elements.

In addition, the decoding device 200 may further include a parser not shown in the drawing that parses information related to the encoded images included in a bitstream. The parser may include the entropy decoder 210, and may be included in the entropy decoder 210. Such a parser may also be implemented as an element of the decoding module.

In order to efficiently compress the image, a block-unit division structure is used. The picture may be divided into a plurality of unit blocks having the same size, and the unit blocks may be recursively divided and divided into blocks of the type most suitable for coding and compression for each unit block. Here, the unit block may correspond to a coding tree unit (CTU), and a block further divided in the unit block may correspond to a coding unit. Here, the coding unit may mean a basic unit for processing an image in a process of the above-described image processing, for example, intra/inter prediction, transform, quantization and/or entropy coding.

FIG. 3 illustrates an example of a fixed block division structure and a variable block division structure.

Referring to FIG. 3, one picture may be divided into a fixed block division structure as shown in FIG. 3(*a*) or a variable block division structure as shown in FIG. 3(*b*). In the case of the fixed block division structure, the side information for block division can be minimized. In the case of the variable block division structure, the side information is relatively increased, but the coding unit of the optimal size may be determined in consideration of image characteristics.

Figure 4:
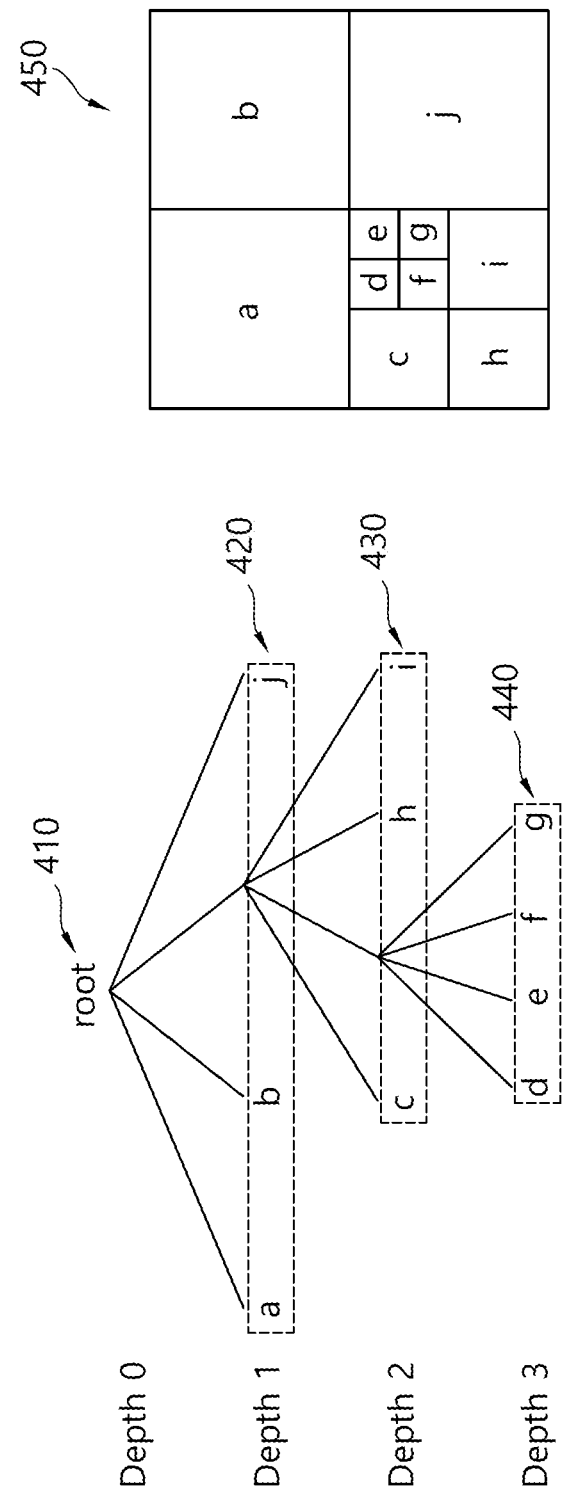
FIG. 4 illustrates the concept of coding unit division.

FIG. 4 illustrates the concept of coding unit division.

The coding unit may have a rectangular shape, and one coding unit may again be divided into several coding units. For example, one coding unit having a size of 2N×2N may be divided again into coding units having four N×N sizes. The division process of such a coding unit can be made recursive, and not all the coding units need be divided into the same form. However, there may be a limitation on the maximum size or the minimum size of the coding unit for convenience in encoding and processing. When the largest size of the coding unit is determined, it is referred to as the size of the largest coding unit (LCU), and when the smallest size of the coding unit is determined, it is referred to as the size of the smallest coding unit (SCU). Here, the maximum coding unit may be referred to as a coding tree unit (CTU), the coding tree unit may be referred to as a coding tree block (CTB), and the coding unit may be referred to as a coding block (CB).

For one coding unit, information indicating whether or not the coding unit is divided may be specified. For example, if the value of the split flag indicating whether to be divided 1, the corresponding coding unit is again divided into four coding units. If the value of the split flag is 0, the corresponding coding unit is not further divided, and the process for the corresponding coding unit can be performed, and prediction and conversion, etc., can be performed based on the coding unit.

The division structure of the coding unit described above can be represented using a tree structure. For example, division may be made with the maximum coding unit as the root. The coding unit in which the current division is made becomes a parent node, and the coding unit divided from the parent node becomes a child node. At this time, the coding unit (parent node) in which the current division is made has child nodes as many as the number of the divided coding units. And the coding unit which is not further divided becomes a leaf node. A leaf node is a node that has no child nodes.

Assuming that a square division is made for one coding unit, one coding unit can be divided into a maximum of four sub-coding units, so that the division structure of the coding unit will be a quad tree structure.

In the encoding device, the maximum and minimum coding unit sizes are determined according to characteristics (e.g., resolution, etc.) of the video image or in consideration of efficiency of encoding, and information about the maximum and minimum coding unit sizes or information capable of drawing such information can be included in the bitstream. In addition, a coding unit having a tree structure can be hierarchically divided with depth information. Each divided sub-coding unit may have depth information. The depth information indicates the number and/or degree of division of the coding unit, and therefore may include information on the size of the sub-coding unit.

For example, assuming that the maximum coding unit size and the maximum depth of the tree are defined and that the square division is performed, the coding unit size becomes a half the size of the parent node coding unit, and thus the minimum encoding unit size can be obtained by using the maximum coding unit size and maximum depth information. Conversely, the maximum coding unit size can be derived and utilized by predefining the minimum coding unit size and the maximum depth of the tree. Since the unit size in a square division can be obtained in the form of a multiple of 2, the size of the actual coding unit can be expressed as a logarithmic value of which the base is 2 so that the transmission efficiency can be increased.

The decoding device can obtain the division information indicating whether the current coding unit is divided. Encoding/decoding efficiency can be increased if such division information is acquired under a specific condition, or if the encoding device is caused to transmit the division information under specific conditions. For example, if the current coding unit is the minimum coding unit (SCU), it is no longer divided into small coding units, so in this case it is not necessary to obtain the division information.

Referring to FIG. 4, the uppermost coding unit 410 may be referred to as a root node and has no parent node. Thus, the uppermost coding unit 410 is a unit which is not divided from a higher coding unit than it is, and may be a maximum coding unit (LCU). For example, the uppermost coding unit 410 may have the smallest depth value.

The uppermost coding unit 410 may be divided into a quadtree structure so that four sub-coding units 420 having a level 1 depth may be generated. Here, at least one of the sub-coding units 420 having a level 1 depth may be divided into a quadtree structure, or may not be further divided. That is, the coding unit can be recursively divided into a quadtree structure until reaching the maximum depth (or maximum level) of the coding unit based on the uppermost coding unit 410.

For example, as shown in FIG. 4, if the maximum allowable depth of a coding unit is level 3, the uppermost coding unit 410 is divided into a quad tree structure recursively up to a depth of level 3, and sub-coding units 420, 430, and 440 may be generated. Here, the sub-coding units 420, 430, and 440 may be divided within the top-most coding unit (i.e., one LCU) to have a division type such as reference numeral 450 of FIG. 4.

Figure 5:
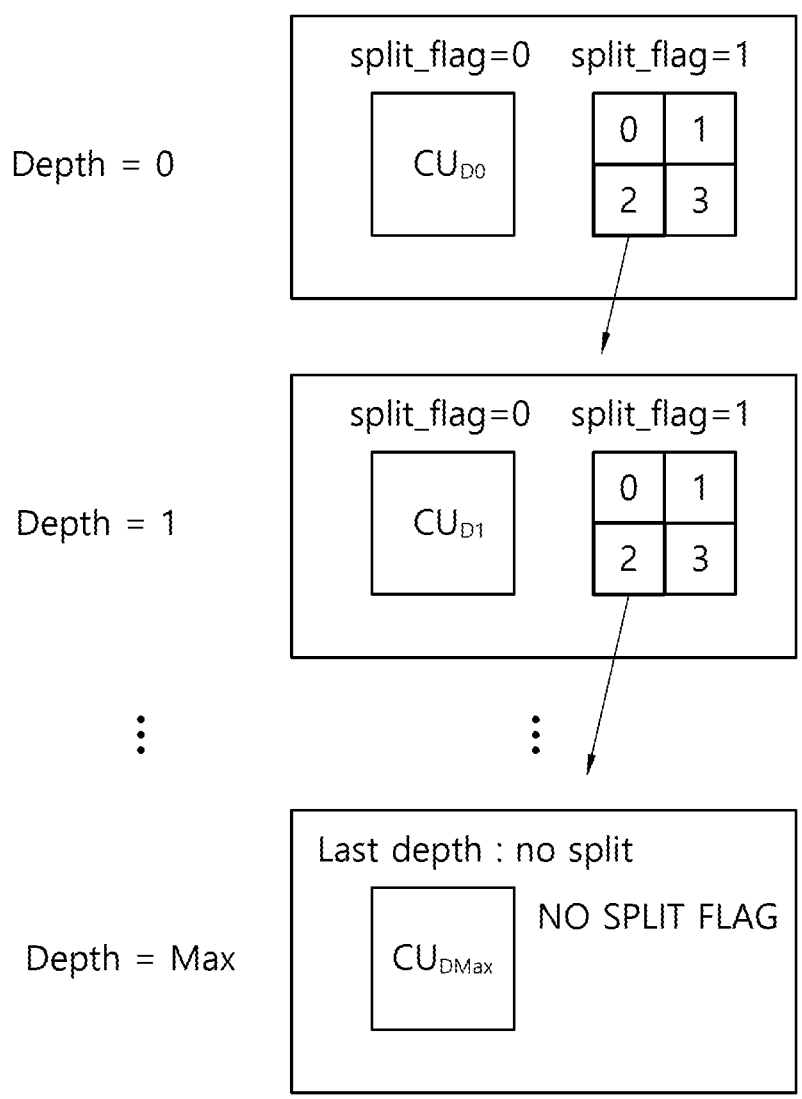
FIG. 5 illustrates an example of coding unit division.

FIG. 5 illustrates an example of coding unit division.

Referring to FIG. 5, a coding unit (CU) of depth 0 is not divided into sub-coding units when the split flag is 0, and is divided into four sub-coding units of depth 1 when the split flag is 1. Here, the four subcoding units may be indexed from 0 to 3 in a raster scan order.

For example, based on no. 2 coding unit of depth 1, when the split flag of the coding unit 410 is 0, it is not divided into the sub-coding units, and when the split flag is 1, it is recursively divided into sub-coding units of depth 2 as a quadtree structure. Until reaching the maximum depth (or last depth), the coding unit can be recursively divided into a quadtree structure.

According to such a CU quadtree division method, it is possible to minimize redundant side information by using a large-sized coding unit in a area where there are a small amount of movements and the texture is simple, while the residual signal can be minimized through more accurate prediction based on the coding unit of the small size in a area where there are a lot of movements and the texture is complicated.

Meanwhile, the block division according to the present invention not only includes the block division of the square structure as described above, but also includes various rectangular divisions in addition to the square division, or a combination of square and rectangular divisions.

Figure 6:
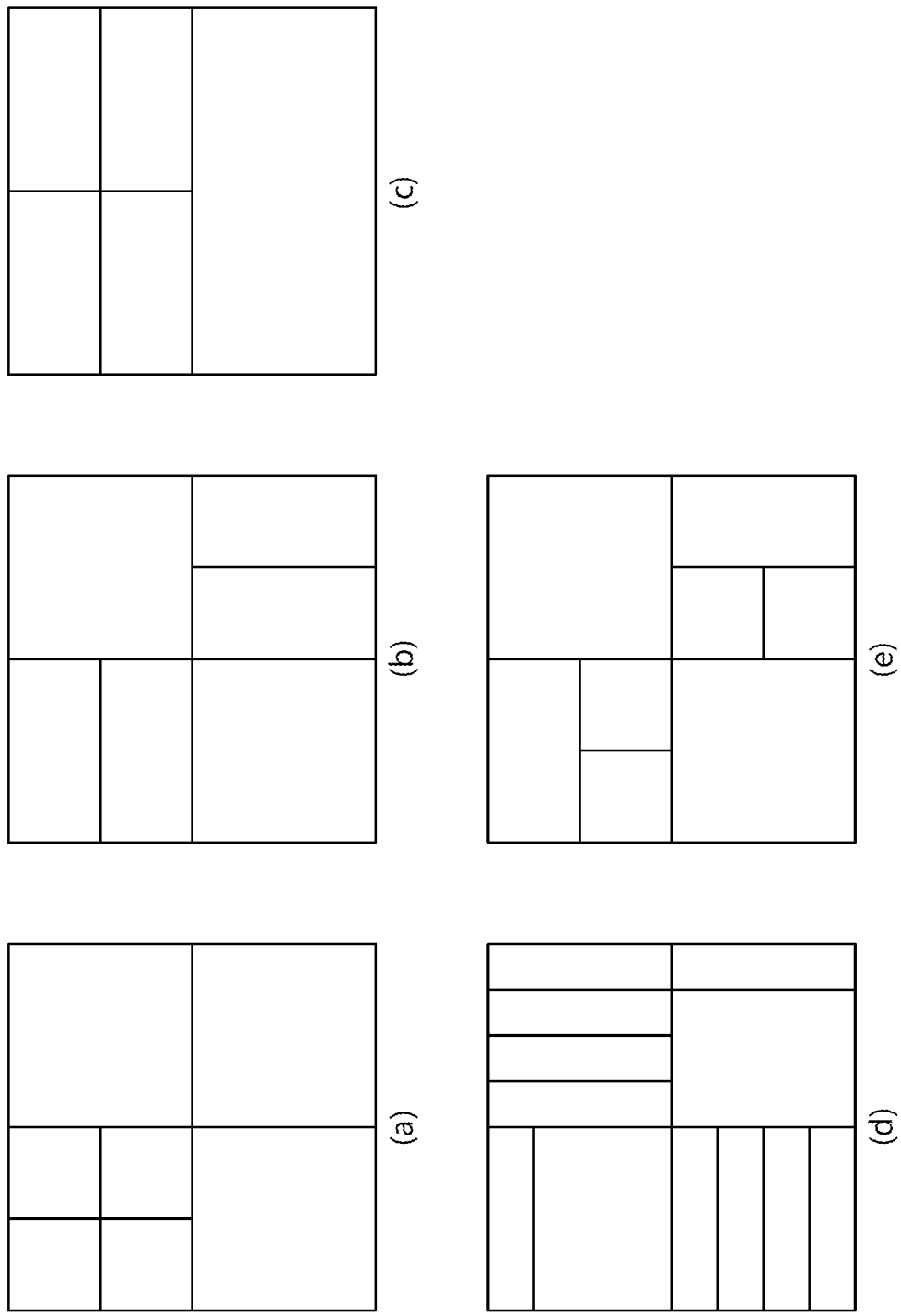
FIG. 6 illustrates examples of forward division and non-forward division.

FIG. 6 illustrates an example of forward division and non-forward division of a unit block.

Referring to FIG. 6, a unit block according to the present invention may include a square division as in FIG. 6(a), and may include various types of non-square divisions as shown in FIGS. 6(b) to 6(e).

As described above, the division information (ex. Split flag) for a unit block is transmitted until a block (ex. CU) derived for division is no longer divided.

Figure 7:
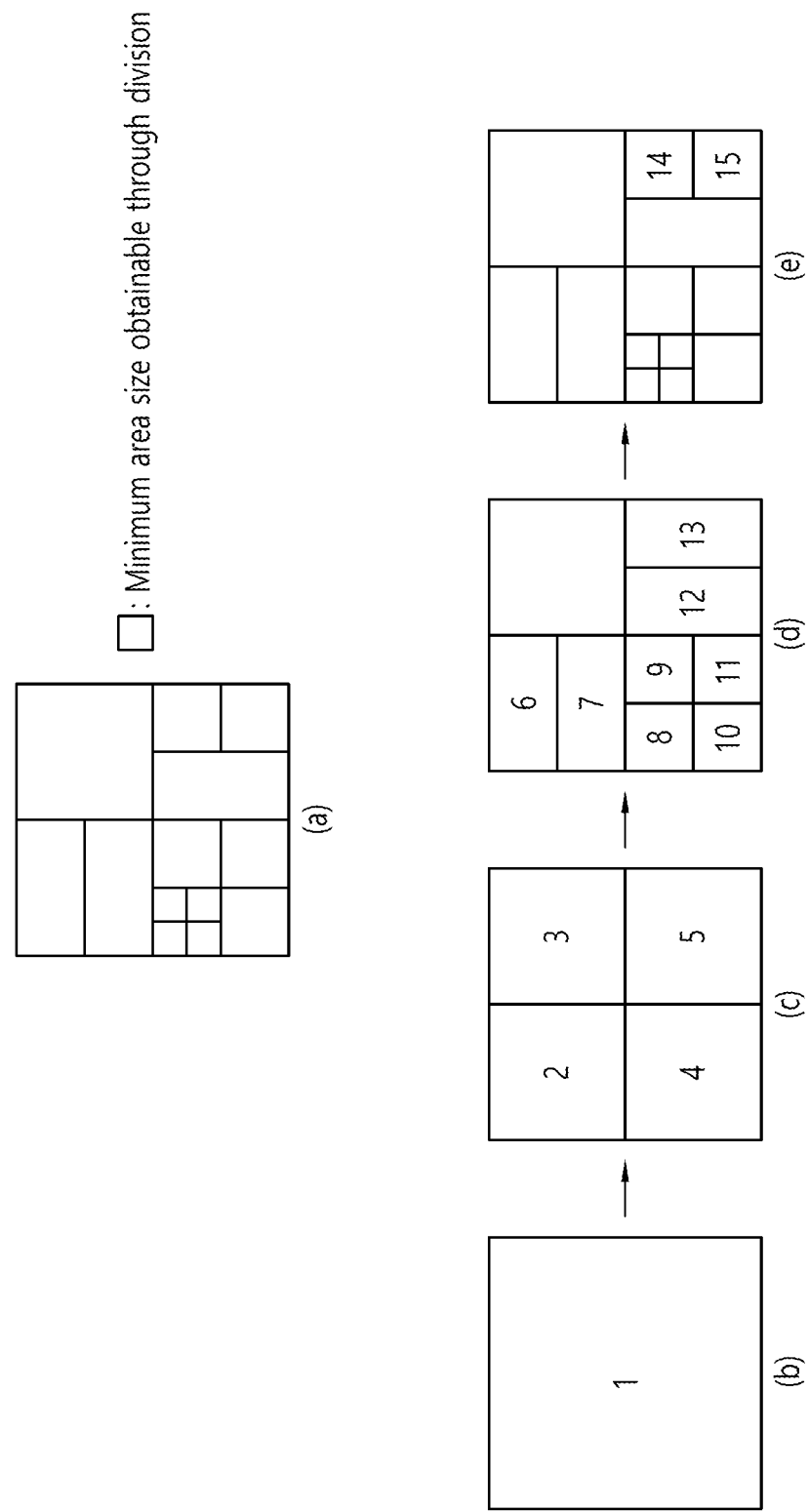
FIG. 7 illustrates an example of information necessary for unit block division.

FIG. 7 illustrates an example of information necessary for unit block division.

Referring to FIG. 7, in the case of a unit block having the division structure as shown in FIG. 7(a), it should be determined whether additional division is to be performed at each step as shown in FIGS. 7(b) to 7(e). That is, 15 division information sets of from 1 to 15 in (b) to (e) are required in the case of the unit block. Here, 1 to 15 indicate that there is information indicating whether or not the area indicated by each number is further divided. The division information can be transmitted in a flag or index form for each block that can be divided, and the amount of the division information also increases when the size of an image or a picture becomes large.

In the present invention, a method for reducing the amount of data used to express the division structure of the target block by reusing block division structure or information of the temporal neighboring picture which is temporally adjacent to the current picture or additionally performing extension based on the block division structure or information of the temporal neighboring picture is proposed. As a result, video compression performance can be improved and encoding/decoding complexity can be reduced. Hereinafter, the neighboring picture may include temporally neighboring pictures. Further, the target block may include the above-described unit block (or CTU), or may include a block of any size.

Figure 8:
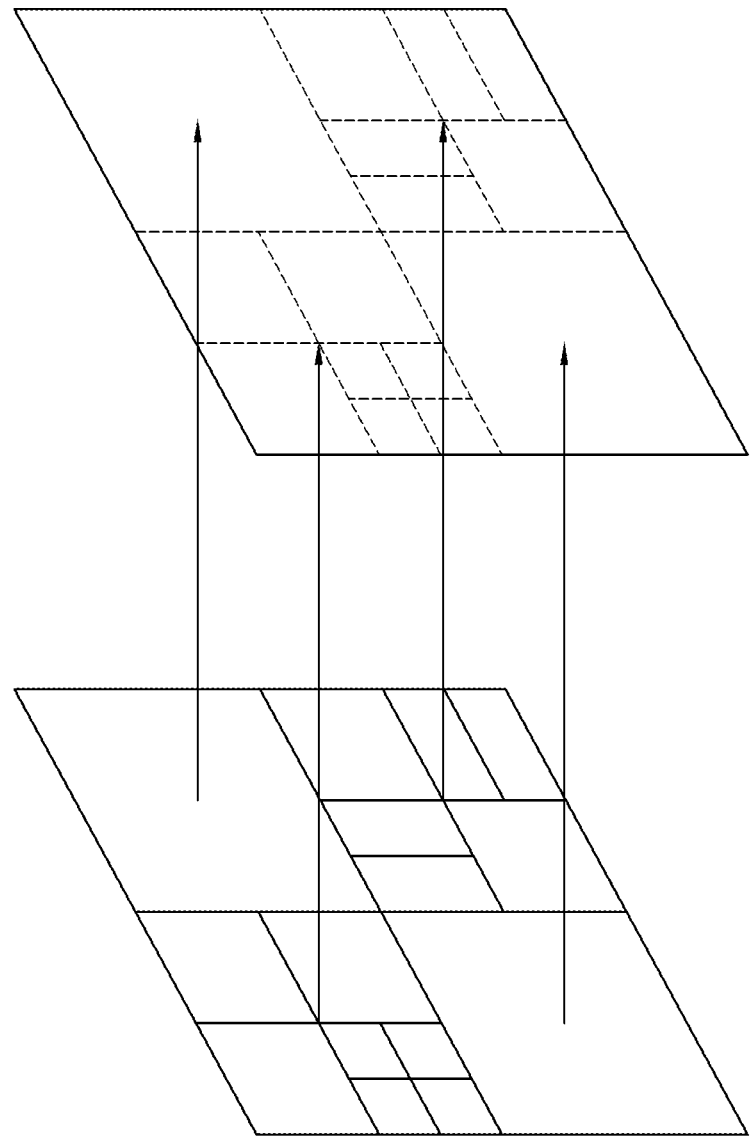
FIG. 8 illustrates an example a reference block of a neighboring picture and a subject block of a current picture corresponding to the reference block.

FIG. 8 illustrates an example of a reference block of a neighboring picture and a target block of a current picture corresponding thereto.

Referring to FIG. 8, part or all of the divided structure of the target block may be derived from a reference block of a neighboring picture. In this case, the division information of the target block can be obtained based on the division information used for the reference block of the neighboring picture, instead of being acquired through the transmitted information. In this case, the reference block may be a unit block at a same position or a specific position of the neighboring picture or a block of a specific size with respect to the target block. The reference block may be referred to as a reference unit block in some cases. The division information used in the reference block may be applied to the target block as it is or the division information refined based on the division information may be applied to the target block according to certain criteria. In this case, for example, the division information up to the depth level n is used as it is, and the division information from the depth level n+1 may be separately signaled or defined according to a specific criterion. Here, n may be any integer greater than 0 and less than the value of the maximum depth level. For example, n may be any one of 1, 2, and 3.

On the other hand, the application unit for deriving the block structure of the current picture based on the block structure of the neighboring picture may be as follows.

a. Whole picture
b. One or more unit blocks
c. Block of a certain size

Whether or not to apply the block division information of the neighboring picture to the current picture (or the current unit block or the like) for each of the units is determined through separate information transmission, is determined by deriving in accordance with a specific criterion, or is determined by the combination of these two methods. Hereinafter, the description will be made based on the target block, and the target block according to the present invention may include a whole picture, a unit block, or a block having a specific size.

For example, the transmitted information may be flag information (e.g., a block structure prediction flag) indicating whether to derive a divided structure of a target block based on a divided structure of a reference block of a neighboring picture, or may be index information indicating a specific picture or a specific reference block.

Also, for example, when determining whether or not to apply the division information of the reference block of the neighboring picture to the target block is derived according to the specific criterion, the specific criterion may include the following.

a. The division structure variation between reference blocks in neighboring pictures b. The motion vector magnitude and/or variation of the reference block in one or more neighboring pictures c. Combination of a and b In the case of a, when division structure variation between reference blocks existing respectively in two or more neighboring pictures coded before a current picture is coded is smaller than a predefined reference, division information of the target block can be derived based on the division information for at least one of the reference blocks. The reference block is a block at the same position or at a specific position in the neighboring picture with respect to the current block, as described above.

For example, assuming that there are two neighboring pictures coded before the current picture is coded (a first neighboring picture and a second neighboring picture), the reference blocks corresponding to target block may respectively exist in the first neighboring picture and the second neighboring picture. In this case, if a reference block existing in the first neighboring picture is referred to as a first reference block and a reference block existing in the second neighboring picture is referred to as a second reference block, the division structure variation may be detected based on the first reference block and the second reference block. For example, when the first reference block and the second reference block have the same or substantially the same division structure, it may mean that the area in which the target block is located is not an area in which there is a moving object but is an area like a background. Accordingly, it is determined that the target block has similar image characteristics to the reference blocks, and a block structure that is the same as or similar to the divided structure for at least one of the reference blocks may be applied to the target block.

Here, the division structure variation may be determined based on the following criteria. For example, the division structure variation may be determined based on the size of an area having a non-identical division structure among all reference blocks. For example, when the area having a division structure that is different from the second reference block in the entire area of the first reference block is within a predetermined reference (for example, 10%), the division information of the target block can be derived based on at least one division information among the reference blocks. In another example, the division structure variation may be determined based on the amount of information (e.g., the number of split flags or split indexes) used to display an area that is not the same among all the reference blocks. For example, k (e.g., 20) split flags are used for the representation of the entire division structure in the first reference block, and when the number of the reference blocks used to express an area having a division structure that is different from the second reference block among them is within a predefined criterion (e.g., k/1; 20/10), the division information of the target block can be derived based on at least one division information among the reference blocks.

In the case of b, if the size of a motion vector of a reference block existing in a neighboring picture coded before the current picture is coded is smaller than a predefined criterion, or if the amount of motion vector variation between reference blocks respectively existing in neighboring pictures coded before the current picture is coded is less than a predefined criterion, division information of the target block may be derived based on the division information of at least one of the reference blocks.

Herein, when one reference block includes a plurality of blocks and a plurality of motion vectors for the plurality of blocks exists, a representative motion vector or a representative motion vector magnitude for the one reference block may be derived and used. Herein, the representative motion vector and the representative motion vector magnitude may indicate a motion vector and a magnitude of a specific position in the reference block, or the representative motion vector magnitude may be based on an average or a median value of absolute values of the plurality of motion vectors. For example, assuming that one motion vector may be stored in units of m×m (where m is a power of 2, e.g., $m=2^4=16$) for coded pictures stored in the decoded picture buffer (DPB), if the size of the reference block is m×m, one motion vector stored for the reference block may become the representative motion vector. Or if the size of the reference block is 4m×4m, a motion vector corresponding to a specific area (for example, a left upper end area) of the four motion vectors stored for the reference block may be the representative motion vector. Or the mean or median value of the absolute values of the 4 motion vectors may be the representative motion vector magnitude. In addition, if the first reference block exists in the first neighboring picture and the second reference block exists in the second neighboring picture, the motion vector variation can be detected based on the first reference block and the second reference block. In this case, the representative motion vector for each reference block may be detected and compared as described above.

If the motion vector magnitude of the reference block is smaller than a predefined criterion or the motion vector variation of the first reference block and the second reference block is smaller than a predefined criterion, this means that even if the picture is changed, there is a high possibility that it is a area that is hardly moved or changed, that is, a area such as a background. Accordingly, it is determined that the target block has similar image characteristics to the reference blocks, and a block structure that is the same as or similar to the division structure for at least one of the reference blocks may be applied to the target block.

On the other hand, even if there is little or no change in the division structure between the reference blocks, the motion vector difference may be large. For example, even if the direction and absolute value of a motion vector are different between two reference blocks, a similar case may occur in the block structure. Accordingly, in this case, by combining the methods a and b as in the above-mentioned c, a block structure identical to or similar to the division structure for at least one of the reference blocks may be applied to the target block only when the division structure change between the reference blocks is equal to or smaller than the first threshold value, and the size at least one of the reference blocks among the reference blocks is smaller than the second threshold value or the motion vector variation between the reference blocks is smaller than the second threshold. For example, if the size of a motion vector in at least one reference block is less than 4 in a pel unit or the difference in motion vector magnitude (or magnitude of motion vector difference) between reference blocks is less than 4 in a quarter pel unit, and the ratio of the area in which the division structure between the reference blocks is less than 10%, a block structure that is the same as or similar to the division structure for at least one of the reference blocks may be applied to the target block.

The numerical values used in the above examples are only examples, and these numerical values may be used as fixed values for the whole image, or may be signaled by pictures, slices or unit blocks.

Figure 9:
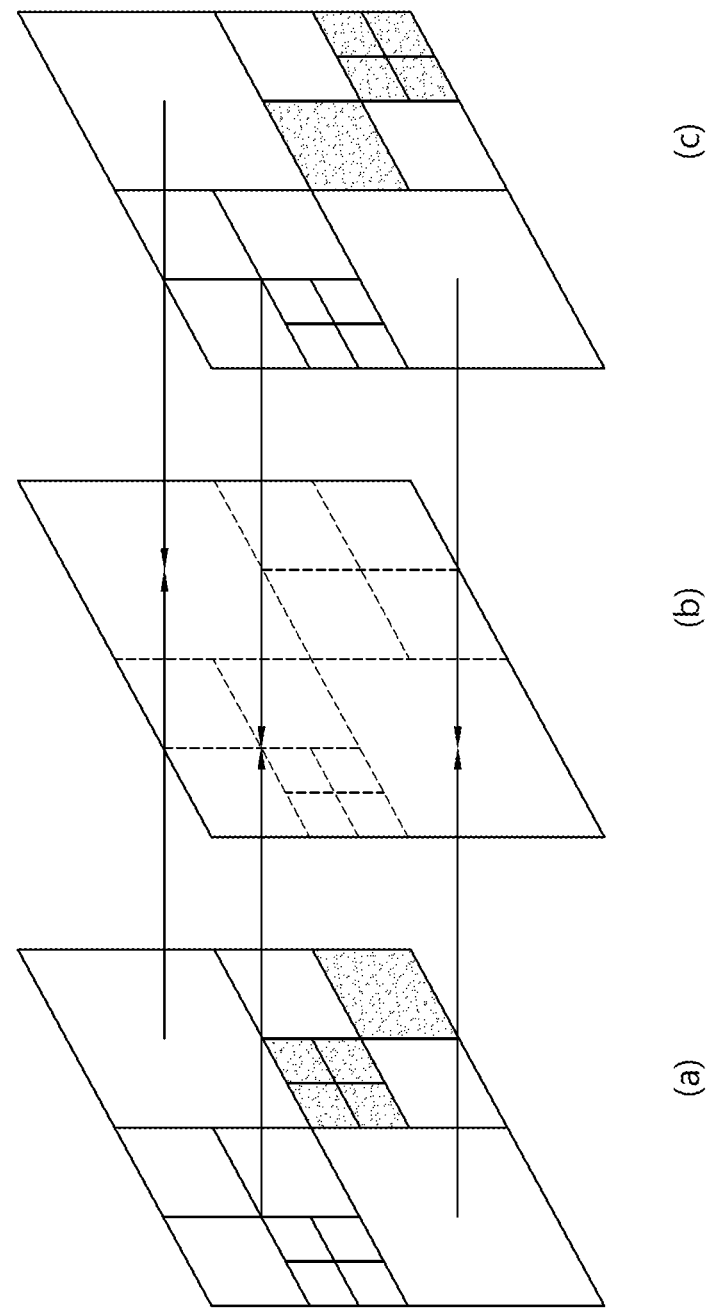
FIG. 9 illustrates an example of deriving a division structure of a target block based on a plurality of reference blocks.

FIG. 9 illustrates an example of deriving a division structure of a target block based on a plurality of reference blocks.

Referring to FIG. 9, (b) shows a target block, and (a) and (c) show reference blocks of neighboring pictures corresponding to the target block. In (a) and (c), the shaded portion represents a area where the divided structure is different. That is, in (a) and (c), the remaining parts except for the shaded part have the same block division structure. Therefore, a portion having the same division structure in (a) and (c) can be used as the division structure of the target block.

On the other hand, the following method can be applied to the area of the target block corresponding to the area where the division structures between the reference blocks do not coincide with each other.

a. Transmission of information to represent the division structure b. Judgment based on predetermined criteria as to which division block of the reference block is to be taken c. Separate information transmission on which reference block to retrieve the division structure In the case of a, at least one division information (split flag, division index, etc.) for indicating a division structure with respect to the area of the target block corresponding to the area where the division structure does not coincide between the reference blocks may be transmitted from the encoding device to the decoding device. In this case, the decoding device may perform the division based on the division information with respect to the area of the target block corresponding to the mismatch area.

In the case of b, the encoding device and the decoding device determine the division structure according to a predetermined criterion with respect to the area of the target block corresponding to the area where the division structure does not coincide between the reference blocks. The predetermined criterion may be determined based on one or a combination of, for example, a direction of a neighboring picture with respect to a current picture, a quality of a neighboring picture, a degree of division of the corresponding area, a division structure commonly appearing in a plurality of neighboring pictures, a distance between the neighboring picture and the current picture, etc.

Figure 10:
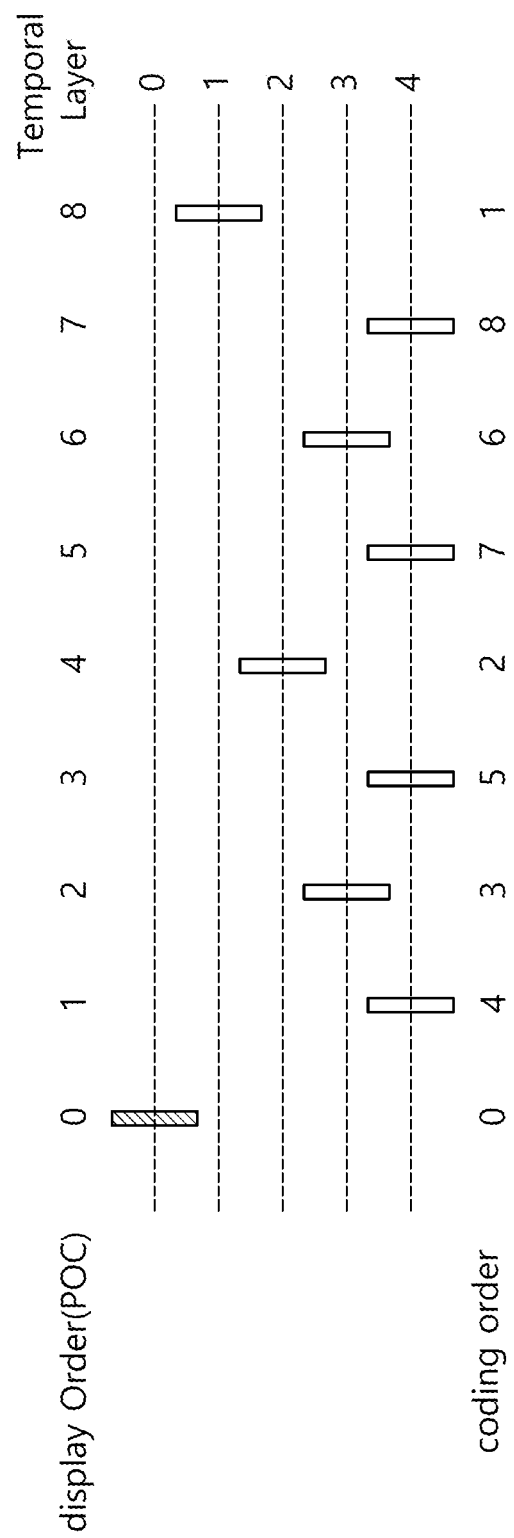
FIG. 10 illustrates an example of a sequence for coding a picture in a random access form and an output sequence.

FIG. 10 illustrates an example of a sequence and an output sequence for coding a picture in a random access form. FIG. 10 shows an example in which the GOP (group of pictures) is 8.

Referring to FIG. 10, the coding order and the output order of pictures may be different from each other. The output order may be based on a picture order count (POC). When considering the POC 3 picture as the current picture, the division structure can be determined based on the combination of at least one or more of the following criteria with respect to the area of the target block corresponding to the area where the divided structure does not coincide between the reference blocks.

(1) When there are a plurality of neighboring pictures, a picture having a POC value lower than the POC of the current picture has priority. For example, when the pictures of POC 1, 2, 4, and 8 are used as the neighboring pictures of the current picture POC 3, the neighboring pictures of POC 1 and 2 have priority over the pictures of POC 4 and 8.

(2) When there are a plurality of neighboring pictures, neighboring pictures having the same or nearest quality criterion as the current picture have priority. For example, the picture quality may be determined based on a temporal layer and/or a quantization parameter (QP). When a high QP is used, the picture quality is lowered, and the QP increases as the temporal layer increases. Thus, in the example of FIG. 10, the neighboring picture of POC #1 has priority.

(3) A neighboring picture having a low degree of division of a corresponding area has priority. In this case, the area indicates a mismatched area between neighboring pictures. For example, if the corresponding area of the POC 2 neighboring picture is not divided and the neighboring pictures of the remaining neighboring pictures are divided, the POC 2 neighboring picture has priority.

(3) When there are three or more neighboring pictures, a majority of neighboring pictures have the same division structure for the area, and if a few neighboring pictures represent another division structure, the structure used for the majority of neighboring pictures has priority. Herein, the area indicates a division structure mismatch area between neighboring pictures as described above. For example, if the POC 1, 2, and 4 neighboring pictures have the same division structure for the corresponding area, and only the POC 8 neighboring picture has a different division structure, the division structure used for the POC 1, 2, and 4 neighboring pictures is applied first.

(4) Among neighboring pictures, neighboring pictures located temporally closest to the current picture have priority. Here, the determination as to whether they are temporally closest to the current picture is made based on POC. That is, POC 2 and 4 neighboring pictures relatively close to the current picture of POC 3 have priority over POC 1 and 8 neighboring pictures. For example, in the case of combining the criterion of (1) and the criterion of (4), the POC 2 neighboring picture has the highest priority in this example.

Meanwhile, in the case of c, indication information for indicating a specific reference picture or a reference block for an area of the target block corresponding to an area where the division structure does not coincide between the reference blocks may be transmitted from the encoding device to the decoding device. In this case, based on the received indication information, the decoding device may determine the reference block which is to be used as the basis when deriving the additional division structure of the area of the target block corresponding to the mismatch area based on the received indication information. For example, in FIG. 9, when the indication information indicates the reference block (a), the division structure of the reference block (a) can be used for a portion of the target block corresponding to the shade portion. That is, in this case, the division structure of the target block is the same as the division structure of the reference block (a). For example, the indication information may be a reference picture index or a reference block index.

On the other hand, as shown in FIG. 10, it is possible to have various qualities in units of pictures in the encoding/decoding process. The fact that a particular picture is encoded/decoded with a higher quality may mean allowing more information amount in terms of side information and residual signal.

For a specific block to be encoded, the cost function for finding the optimal combination of the additional information and the residual signal can be expressed by the following equation.

$$Cost = D + \lambda R \quad \text{[Equation 1]}$$

Herein, D represents a distortion which is the difference between the original signal and the prediction signal, R represents the data rate of the additional information, and λ is a parameter for the trade-off between D and R. λ has a characteristic proportional to a quantization parameter QP.

As the QP value is lowered to improve the quality of the picture, the λ is also reduced accordingly, and consequently the cost function becomes less sensitive to the change in R. That is, since the influence of the increase of the additional information amount on the overall cost function is lowered, it is divided into a more detailed block structure, and the distortion is reduced by using more specific additional information by the divided areas, thereby reducing the overall cost.

Therefore, according to the present invention, when the quality level of the current picture is different from that of the neighboring picture, the block division structure acquired based on the reference block can be additionally extended. That is, according to the present invention, a division structure for a target block can be derived by refining a block division structure acquired based on a reference block.

In the example of FIG. 10, in most of the cases, the QP of a later coded picture is equal to or higher than a previously coded picture, and thus the later coded picture has a lower quality. As can be seen from the above relationship of the cost function formula, as the coding proceeds in the coding order, there is a high possibility that the later picture is a picture having a relatively lower quality than the previous pictures, and is likely to have a relatively less detailed divided structure. Therefore, when the division structure of the target block is derived based on the division structure of the reference block of the neighboring picture in consideration of these characteristics, the division structure of the reference block can be integrated in a less granular unit. That is, according to the present embodiment, a second division structure (an integrated block division structure) is derived by performing integration based on the first division structure of a reference block, and the final division structure may be derived based on the second division structure. In this case, for example, if the final depth according to the first division structure is n, the second division structure may have a division structure up to a depth n or less (e.g., n−1 or n−2). The final division structure for the target block may be the same as the second division structure, or may be a division structure which is derived by segmentation according to additional information and/or specific criteria based on the second division structure.

Figure 11:
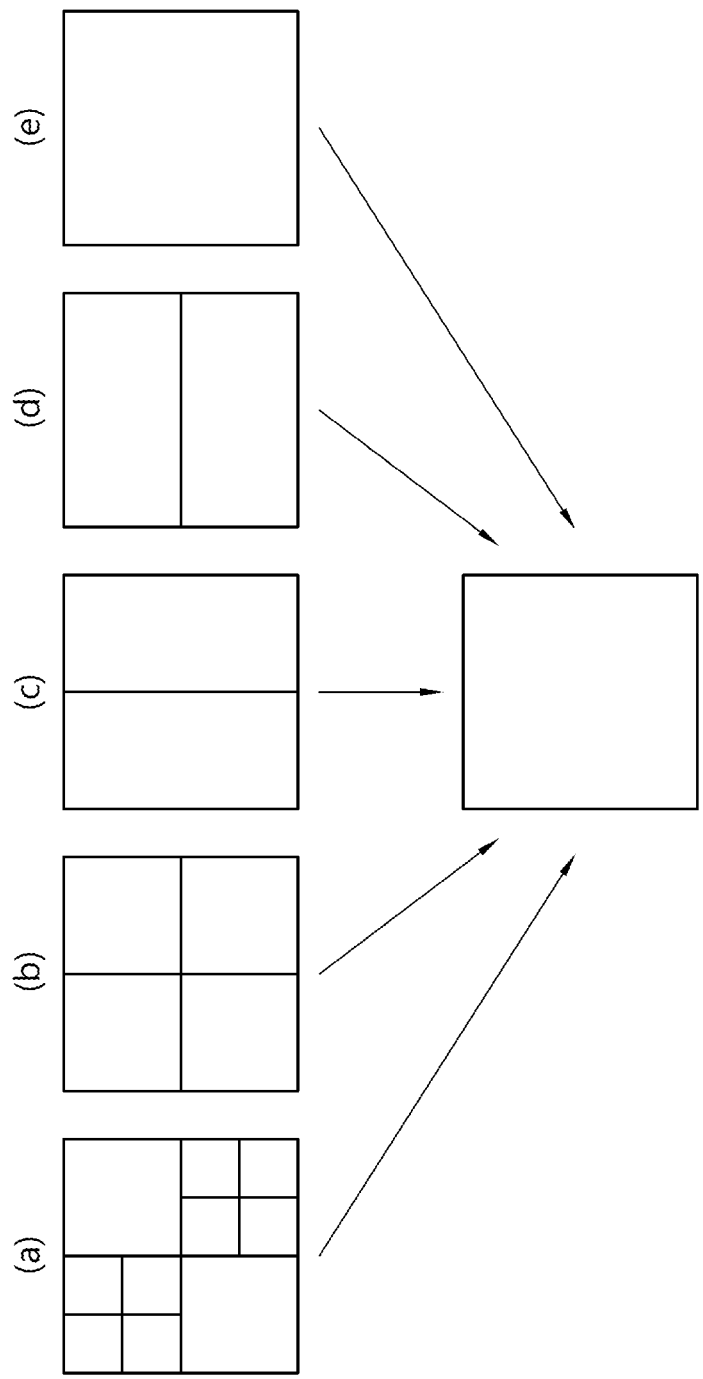
FIG. 11 illustrates various examples of block division structure integration.

FIG. 11 shows various examples of block division structure integration.

Referring to FIG. 11, (a) to (e) show a division structure and an integration relation of a part of a reference block. (a) through (e) division structures can be integrated into equivalent or less granular units as shown by the arrows.

In the case of (a), the integration is performed by the depth level 2. In the case of (b), the integration is performed by the depth level 1. In the case of (c), the integration is performed by the depth level 1, and it is an example of integrating vertically divided rectangular detailed block structures. In the case of (d), the integration is performed by the depth level 1 and it is an example of integrating the rectangular detailed block structure which is divided in the horizontal direction. In the case of (e), the existing block division structure is used as it is.

When deriving the integrated block division structure, three factors, that is, whether or not the integrated block division structure is applied, the integrated block division structure application unit, and the integrated block division structure level, should be determined. The above three factors can be determined in the following manner.

First of all, the unit for applying the integrated block division structure and whether or not it is applicable can be determined based on the following.

a. It is applied to the whole picture. Information indicating whether it is applied on a picture-by-picture basis is transmitted.

b. Alternatively, It is applied by unit blocks. Information indicating whether to be applied is transmitted.

c. Alternatively, it is defined in advance in a fixed manner, or the application unit and/or the size may be defined in advance in a parameter transmission stage such as a stationary definition, a sequence parameter set (SPS), a picture parameter set (PPS), an adaptation parameter set (APS) or a slice header, and information indicating whether or not it is applicable is transmitted.

d. Alternatively, it is applied by unit blocks. Herein, as described above, the comparison with the threshold value is performed based on at least one of the division structure variation, the motion vector size, and the motion vector variation amount between the reference blocks without applying the separate application indication information, in order to determine whether to perform application.

In addition, the integrated block division structure level can be determined based on the following. Herein, the integrated block division structure level indicates how much depth levels are integrated in the division structure.

a. The additional information is transmitted, and only the additional division information is transmitted based on the reference block structure to determine the integrated block division structure level.

b. Alternatively, it is possible to apply a predefined fixed level in advance for each integrated block division structure application unit, apply an integrated block division structure level defined in parameter transfer stages such as SPS, PPS, APS, or slice header, or send information indicating integrated block division structure level.

c. Alternatively, an integrated block division structure is applied to a unit block, but information indicating a separate integrated block division structure level is not transmitted. As described above, at least one of the division structure variation, the motion vector magnitude, and the motion vector variation is used as the basis, and when at least one of the division structure variation, the motion vector magnitude, and the motion vector variation is included in one or more reference ranges defined beforehand, an integrated block division structure level corresponding to the reference range is applied.

According to the method a, for example, it is possible to derive an integrated block division structure that is less subdivided than the division structure of the reference block, compare the division structure of the reference block with the integrated block division structure, to thereby transmit division information based thereon.

Figure 12:
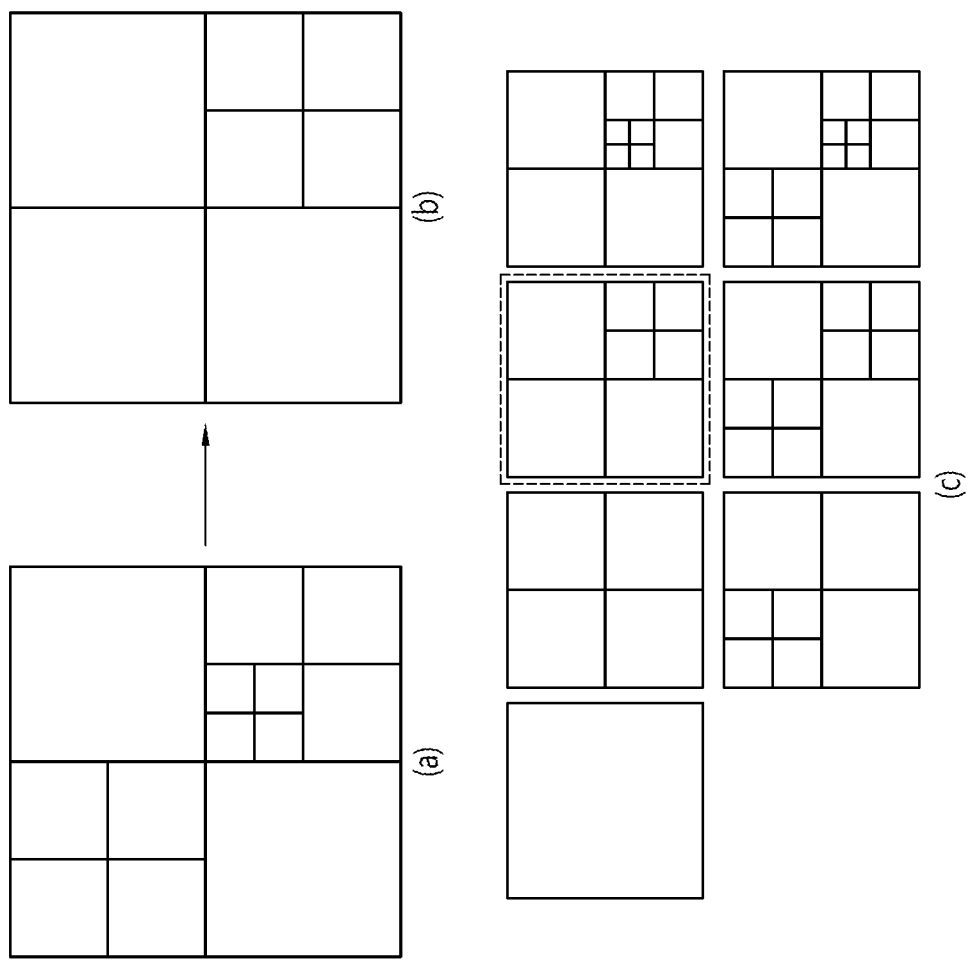
FIG. 12 illustrates an example of derivation of an integrated block division structure.

FIG. 12 illustrates an example of derivation of an integrated block division structure.

Referring to FIG. 12, (a) shows a reference block division structure, and (b) shows an integrated block division structure derived by referring to the division structure of the reference block. Based on the above (a), there may exist various integrated block division structure candidates theoretically as shown in (c). In this case, the integrated block division structure may be derived based on the above-described criteria and/or explicit indication information. In this embodiment, a third candidate of the integrated block division structure candidates of (c) is derived as an integrated block division structure for the target block.

In this case, the division structure of the target block can be derived based on the derived integrated block division structure. In this case, the reference block division structure and the integrated block division structure are compared to try to divide only the area having a difference (i.e., the less segmented area), and the division structure having the smallest cost function can be selected as a division structure for the target block. For example, the encoding device may derive additional division information for the area of difference, and may encode the additional division information and transmit the additional division information to the decoding device. The decoding device may derive a division structure for the target block based on the integrated block division structure and the additional division information.

Figure 13:
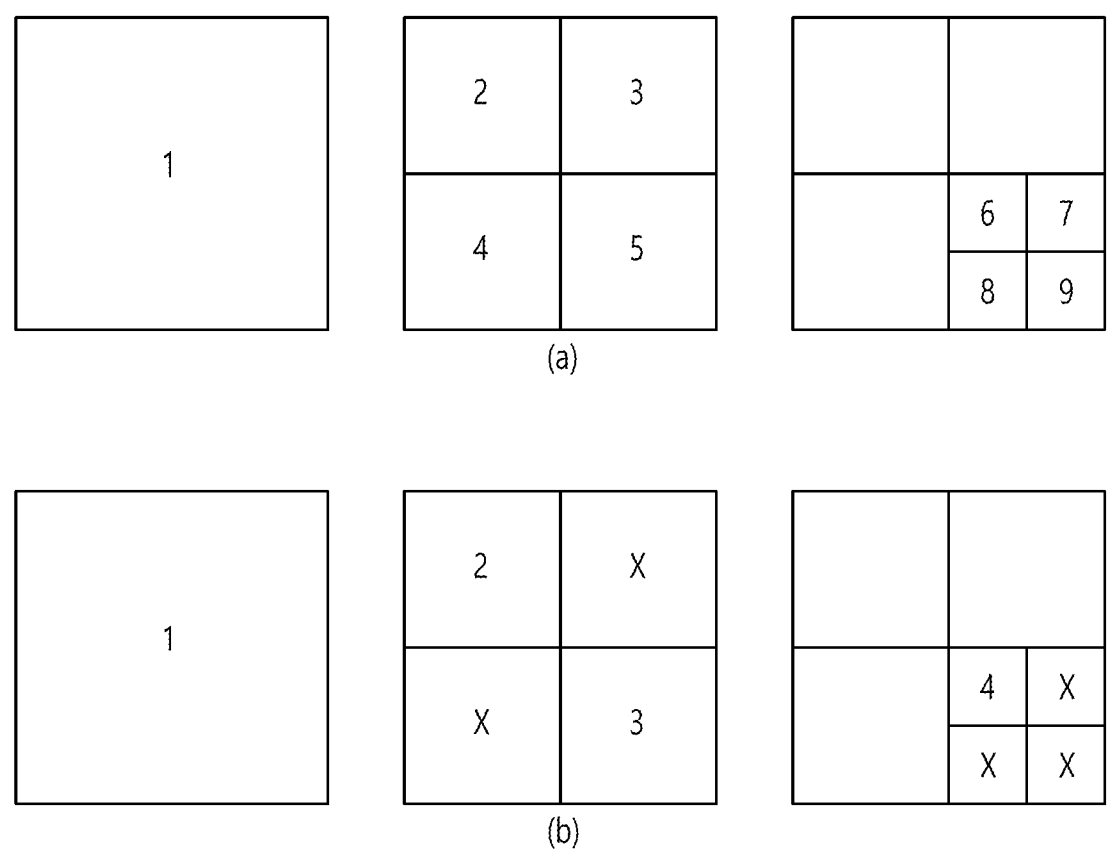

FIG. 13 illustrates an example of a comparison between the data amount of the existing division information and the data amount of the division information according to the present invention. FIG. 13 shows an example in which the integrated block division structure derived from FIG. 12 is used.

Referring to FIG. 13, (a) shows the data amount of the division information according to the existing method, and (b) shows the data amount of the division information according to the present invention. According to (a), it is necessary to transmit a total of 9 segment flags in order to represent the division structure of the target block. On the other hand, according to (b), it is possible to additionally determine whether or not the division is performed only when the division is less segmented (or the same case) based on the integrated block division structure. Therefore, when the level reaches the same level as the depth level of each detailed block of the reference block, the division information may not be transmitted to the detailed block. In this case, as shown in (b), a total of four division information (split flags) may be transmitted to indicate the division structure of the target block. As described above, the detailed block can correspond to the CU.

Figure 14:
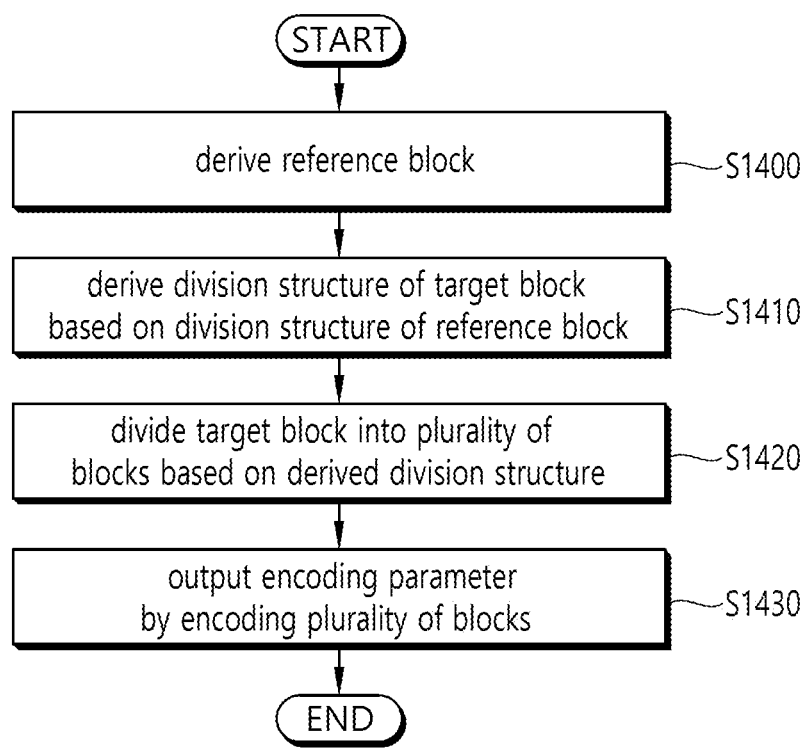
FIG. 14 schematically illustrates an example of a video encoding method according to the present invention.

FIG. 14 schematically shows an example of a video encoding method according to the present invention. The method disclosed in FIG. 14 can be performed by an encoding device.

Referring to FIG. 14, the encoding device derives at least one reference block for a current block of a current picture (S1400). The at least one reference block may be located in a temporally neighboring picture of the current picture. That is, when there are a plurality of reference blocks, each reference block may be located in a different neighboring picture.

The encoding device derives a division structure of the target block based on the division structure of the at least one reference block (S1410). The encoding device can derive an optimal division structure for the target block based on the RD cost. The additional information can be reduced when the division structure of the at least one reference block is used. The encoding device may perform the division for the target block using the division structure of the at least one reference block when it is determined that the RD cost is lower when the division structure of the at least one reference block is used.

In this case, the encoding device may derive the division structure of the target block based on the division structure of the at least one reference block only in a specific case.

For example, the at least one reference block may include a first reference block and a second reference block, and if the variation of the block division structure between the first reference block and the second reference block is smaller than a first threshold, the division information of the target block may be derived based on the division information of the at least one reference block.

In addition, for example, the encoding device may derive a representative motion vector magnitude for the at least one reference block, and if the representative motion vector magnitude is smaller than a second threshold value, the division structure of the target block may be derived based on the division structure of the at least one reference block.

For example, if the motion vector variation between the first reference block and the second reference block is less than a third threshold value, the encoding device may derive the division structure of the target block based on the division structure of the at least one reference block.

For example, the encoding device can detect an area having the same division structure based on the division structure of the first reference block and the division structure of the second reference block, and can derive the division structure of the target block based on the division structure for the detected area.

In addition, the encoding device may select a specific reference block among a plurality of reference blocks, and use the divided structure of the selected specific reference block as a division structure of the target block. In this case, the specific reference block may be located in a specific reference picture selected from the plurality of reference pictures based on at least one of a picture order count (POC) value and a temporal layer value of each of the plurality of reference pictures. Alternatively, the specific reference block may be located in a reference picture having a POC value that has the smallest difference from the POC value of the current picture among the plurality of reference pictures. Alternatively, the specific reference block may be a reference block having the lowest degree of division among the plurality of reference blocks. The encoding device may encode indication information for indicating the specific reference picture or the specific reference block to thereby be outputted through the bitstream.

As another example, the encoding device may derive an integrated block division structure based on the division structure of the at least one reference block, and derive the division structure of the target block based on the integrated block division structure. In this case, the final depth level of the integrated block division structure may be set to be lower than the final depth level of the division structure of the at least one reference block. In this case, the encoding device can generate the integrated block division structure application flag and output it through the bit stream. When the depth level of the portion corresponding to the depth level of the corresponding area according to the integrated block division structure is lower than the final depth level of the area according to the division structure of the at least one reference block, a split flag indicating whether to additionally divide the corresponding area of the target block may be generated and transmitted to the decoding device through the bitstream.

The encoding device divides the target block into a plurality of detailed blocks based on the derived division structure (S1420). Here, the target block may include a unit block (or CTU, CTB) as described above, or may include a block of any size. The detail block may also include a CU (or CB). Or the detailed block may include a PU or a TU.

The encoding device encodes the plurality of detailed blocks and outputs encoding parameters (S1430). The encoding device may output the encoding parameters in the form of a bitstream. The bitstream may be transmitted to a decoding device via a network or a storage medium. In this case, the encoding device may transmit separate information for indicating a prediction mode for each of the plurality of detail blocks. For example, prediction mode information for the first detailed block and prediction mode information for the second detailed block may be individually generated and transmitted through the bitstream.

On the other hand, the encoding device generates flag information (e.g., a block structure prediction flag) indicating whether or not to derive the division structure of the target block based on the division structure of the reference block of the neighboring picture and outputs the information through the bitstream. Alternatively, the encoding device may generate index information indicating whether a neighboring picture/reference block is to be used and output the generated index information through the bitstream.

Figure 15:
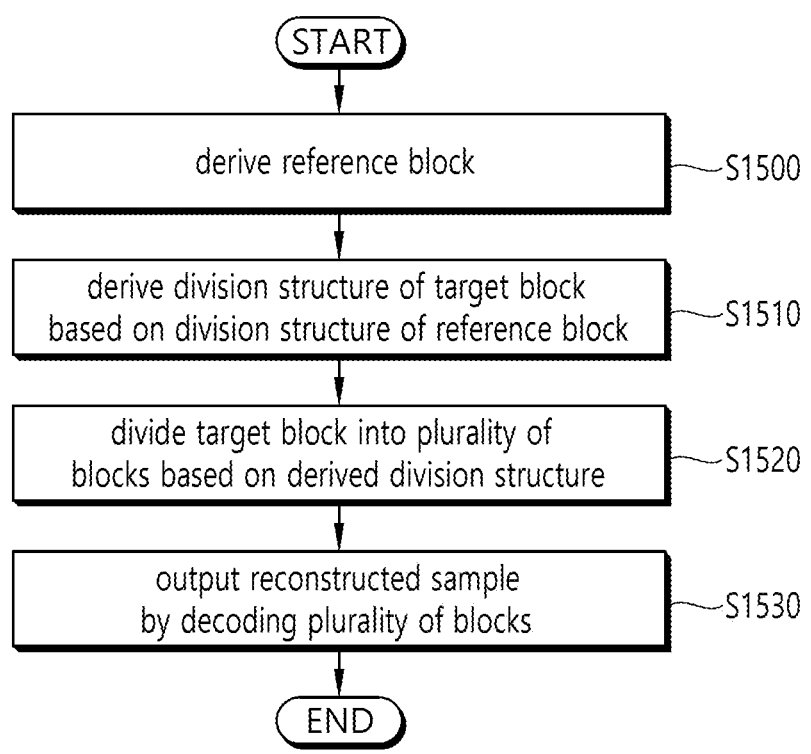
FIG. 15 schematically illustrates an example of a video decoding method according to the present invention.

FIG. 15 schematically shows an example of a video decoding method according to the present invention. The method disclosed in FIG. 15 can be performed by a decoding device.

Referring to FIG. 15, the decoding device derives at least one reference block for a current block of a current picture (S1500). The at least one reference block may be located in a temporally neighboring picture of the current picture. That is, when there are a plurality of reference blocks, each reference block may be located in a different neighboring picture.

The decoding device derives the division structure of the target block based on the division structure of the target block based on the division structure of the at least one reference block (S1510).

In this case, the decoding device can derive the division structure of the target block based on the division structure of the at least one reference block only in a specific case.

For example, the decoding device can obtain flag information (e.g., a block structure prediction flag) indicating whether to derive a division structure of a target block based on the division structure of the reference block of the neighboring picture through the received bitstream. In this case, when the value of the obtained block structure prediction flag is 1, the decoding device can derive the division structure of the target block based on the division structure of the at least one reference block.

In addition, for example, the at least one reference block may include a first reference block and a second reference block, and the decoding device may derive the division structure of the target block based on the division structure of the at least one reference block when the variation of the block division structure between the first reference block and the second reference block is smaller than the first threshold value.

In addition, for example, the decoding device derives a representative motion vector magnitude for the at least one reference block, and when the representative motion vector magnitude is smaller than a second threshold value, the division structure of the target block may be derived.

In addition, for example, when the motion vector variation between the first reference block and the second reference block is less than the third threshold, the decoding device may divide the division structure of the target block based on the division structure of the at least one reference block.

For example, the decoding device can detect an area having the same division structure based on the division structure of the first reference block and the division structure of the second reference block, and can derive the division structure of the target block based on the division structure for the detected area.

Also, the decoding device may select a specific reference block from among a plurality of reference blocks, and use the division structure of the selected specific reference block as a division structure of the target block. In this case, the specific reference block may be located in a specific reference picture selected from the plurality of reference pictures based on at least one of a picture order count (POC) value and a temporal layer value of each of the plurality of reference pictures. Alternatively, the specific reference block may be located in a reference picture having a POC value that has the smallest difference from the POC value of the current picture among the plurality of reference pictures. Alternatively, the specific reference block may be a reference block having the lowest degree of division among the plurality of reference blocks. Alternatively, the decoding device may receive, via a bit stream, indication information for indicating a specific reference picture or a specific reference block.

As another example, the decoding device may derive an integrated block division structure based on the division structure of the at least one reference block, and derive the division structure of the target block based on the integrated block division structure. In this case, the final depth level of the integrated block division structure may be set to be lower than the final depth level of the division structure of the at least one reference block. The decoding device may obtain an integrated block division structure application flag from the bitstream, and when the value of the obtained integrated block division structure application flag indicates 1, the decoding device may derive the integrated block division structure based on the division structure of the at least one reference block and derive the division structure of the target block based on the integrated block division structure. When the depth level of the portion corresponding to the depth level of the corresponding area according to the integrated block division structure is lower than the final depth level of the area according to the division structure of the at least one reference block, the decoding device may obtain a split flag indicting whether to additionally divide the corresponding area of the target block from the bitstream.

The decoding device divides the target block into a plurality of detailed blocks based on the derived division structure (S1520). Here, the target block may include a unit block (or CTU, CTB) as described above, or may include a block of any size. The detailed block may also include a CU (or CB). Or the detailed block may include a PU or a TU.

The decoding device decodes the plurality of detailed blocks to generate reconstructed samples (S1530). In this case, the decoding device can generate prediction samples by applying various prediction methods to the plurality of detailed blocks, and generate reconstruction samples based on the prediction samples. For example, the inter prediction mode may be used as the prediction mode for the first detailed block among the detailed blocks, and the intra prediction mode may be used as the prediction mode for the second detailed block. Alternatively, the skip mode may be applied to the plurality of detailed blocks so that the prediction samples for the corresponding detailed blocks may be directly derived as reconstructed samples.

According to the present invention, the division structure of the target block of the current picture can be derived based on the division information of the reference block of the neighboring picture. As a result, the data amount for the additional information signaled for dividing the current block of the current picture can be reduced, and the overall coding efficiency can be improved.

The above description is only illustrative of the technical idea of the present invention. Therefore, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding apparatus, the video decoding method comprising:
   deriving at least one reference block for a target block;
   deriving a division structure of the target block based on a division structure of the at least one reference block;
   dividing the target block into a plurality of blocks based on the derived division structure; and
   decoding the plurality of blocks to generate reconstructed samples,
   wherein the at least one reference block comprises a first reference block and a second reference block, and
   wherein the division structure of the target block is derived based on the division structure of the at least one reference block when a variation of a block division structure between the first reference block and the second reference block is smaller than a first threshold value.

2. The video decoding method of claim 1, wherein the at least one reference block is located in a temporally neighboring picture of the current picture in which the target block is located.

3. The video decoding method of claim 1, further comprising:
   obtaining a block structure prediction flag from a bitstream,
   wherein the division structure of the target block is derived based on the division structure of the at least one reference block when a value of the obtained block structure prediction flag is 1.

4. The video decoding method of claim 1, further comprising:
   deriving a representative motion vector magnitude for the at least one reference block,
   wherein the division structure of the target block is derived further based on the division structure of the at least one reference block when a magnitude of the representative motion vector is smaller than a second threshold value.

5. The video decoding method of claim 1,
   wherein the division structure of the target block is derived further based on the division structure of the at least one reference block when a motion vector variation between the first reference block and the second reference block is less than a third threshold value.

6. The video decoding method of claim 1, further comprising:
   detecting an area having the same division structure based on the division structure of the first reference block and the division structure of the second reference block,
   wherein the at least one reference block includes the first reference block and the second reference block, and
   wherein the division structure of the target block is derived based on a division structure for the detected area.

7. The video decoding method of claim 1, further comprising:
   selecting a particular reference block from among a plurality of reference blocks,
   wherein the at least one reference block comprises the plurality of reference blocks,
   wherein the plurality of reference blocks are respectively located in a plurality of reference pictures, and
   wherein the division structure of the selected particular reference block is used as the division structure of the target block.

8. The video decoding method of claim 7, wherein the particular reference block is located in a specific reference picture selected from the plurality of reference pictures based on at least one of a picture order count (POC) value and a temporal layer value of each of the plurality of reference pictures.

9. The video decoding method of claim 7, wherein the particular reference block is located in a reference picture having a POC value that has the smallest difference from the POC value of the current picture among the plurality of reference pictures.

10. The video decoding method of claim 1, wherein the deriving of the division structure of the target block comprises:
    deriving an integrated block division structure based on the division structure of the at least one reference block; and
    deriving the division structure of the target block based on the integrated block division structure.

11. The video decoding method of claim 10, wherein a final depth level of the integrated block division structure is lower than a final depth level of the division structure of the at least one reference block.

12. The video decoding method of claim 10, further comprising:
    obtaining an integrated block division structure application flag from a bitstream,
    wherein, when a value of the obtained integrated block division structure application flag indicates 1, an integrated block division structure is derived based on the division structure of the at least one reference block, and the division structure of the target block is derived based on the integrated block division structure.

13. The video decoding method of claim 11, further comprising:

obtaining a split flag from the bitstream, wherein, when a depth level of a portion corresponding to a depth level of a corresponding area according to the integrated block division structure is lower than a final depth level of an area according to a division structure of the at least one reference block, the split flag indicates whether to further divide the corresponding area of the target block.

14. A video encoding method performed by an encoding device, the video encoding method comprising:

deriving at least one reference block for a target block;

deriving a division structure of the target block based on a division structure of the at least one reference block;

dividing the target block into a plurality of blocks based on the derived divided structure; and encoding the plurality of blocks to thereby output an encoding parameter, wherein the at least one reference block comprises a first reference block and a second reference block, and wherein the division structure of the target block is derived based on the division structure of the at least one reference block when a variation of a block division structure between the first reference block and the second reference block is smaller than a first threshold value.

15. The video encoding method of claim 14, further comprising:

deriving a representative motion vector magnitude for the at least one reference block, wherein the division structure of the target block is derived further based on the division structure of the at least one reference block when a magnitude of the representative motion vector is smaller than a second threshold value.

16. The video encoding method of claim 14, wherein the division structure of the target block is derived further based on the division structure of the at least one reference block when a motion vector variation between the first reference block and the second reference block is less than a third threshold value.

17. The video encoding method of claim 14, further comprising:

detecting an area having the same division structure based on the division structure of the first reference block and the division structure of the second reference block, wherein the at least one reference block includes the first reference block and the second reference block, and wherein the division structure of the target block is derived based on a division structure for the detected area.

18. The video encoding method of claim 14, further comprising:

selecting a particular reference block from among a plurality of reference blocks, wherein the at least one reference block comprises the plurality of reference blocks, wherein the plurality of reference blocks are respectively located in a plurality of reference pictures, and wherein the division structure of the selected particular reference block is used as the division structure of the target block.

19. The video encoding method of claim 14, wherein the deriving of the division structure of the target block comprises:

deriving an integrated block division structure based on the division structure of the at least one reference block; and deriving the division structure of the target block based on the integrated block division structure.

* * * * *